Figure 1:
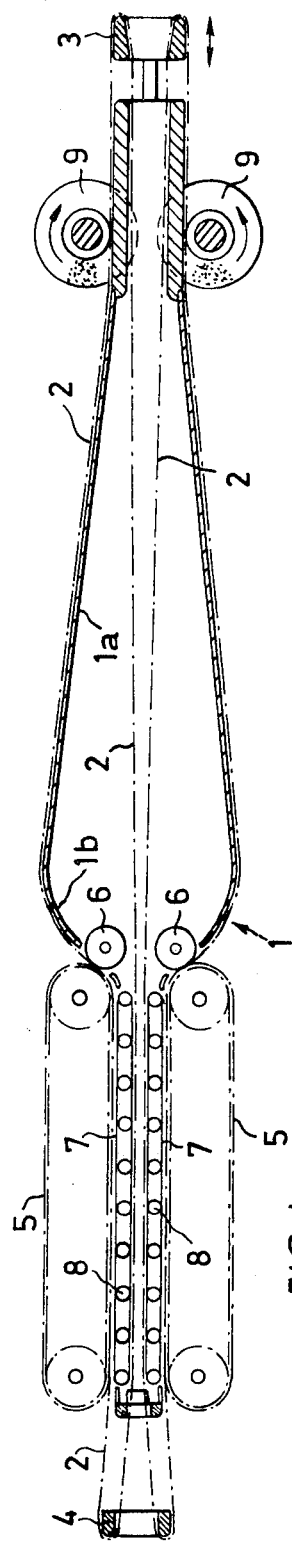

United States Patent [19]

Mercer

[11] 4,124,350

[45] Nov. 7, 1978

[54] APPARATUS FOR TRANSVERSELY STRETCHING TUBULAR MATERIALS

[75] Inventor: Frank B. Mercer, Blackburn, England

[73] Assignee: F.B. Mercer Limited, Lancashire, England

[21] Appl. No.: 782,343

[22] Filed: Mar. 29, 1977

[30] Foreign Application Priority Data

Mar. 29, 1976 [GB] United Kingdom .............. 12524/76
Sep. 24, 1976 [GB] United Kingdom .............. 39702/76

[51] Int. Cl.² ............................................ B29C 17/02
[52] U.S. Cl. ................................ 425/393; 425/72 R; 425/403; 425/445; 264/292
[58] Field of Search ................... 425/66, 72, 403, 404, 425/393, 445; 264/292

[56] References Cited

U.S. PATENT DOCUMENTS

| | | |
|---|---|---|
| 2,697,248 | 12/1954 | Longstreth et al. ............. 425/403 X |
| 3,334,391 | 8/1967 | Kueters et al. ..................... 425/66 X |
| 3,539,666 | 10/1970 | Schirmer ........................... 425/72 X |
| 3,600,488 | 8/1971 | Yazawa .............................. 425/72 X |
| 3,853,448 | 12/1974 | Yazawa .............................. 425/72 X |

*Primary Examiner*—Robert L. Spicer, Jr.
*Attorney, Agent, or Firm*—Holman and Stern

[57] ABSTRACT

A machine for transversely stretching tubular materials comprises a hollow diverging mandrel and an endless sleeve of a flexible knitted fabric which toroidally embraces the mandrel. In use tubular material to be stretched is driven over the mandrel surface along with the flexible sleeve by friction drive means in the form of endless belts.

5 Claims, 3 Drawing Figures

U.S. Patent     Nov. 7, 1978     4,124,350

APPARATUS FOR TRANSVERSELY STRETCHING TUBULAR MATERIALS

This invention relates to apparatus for transversely stretching tubular materials such as plastics films or nets so as to orientate the molecules in the material.

It is an object of the invention to provide an apparatus which can produce pure transverse stretching of a tubular material substantially without producing any longitudinal or machine direction stretching forces on the material. This type of process finds particular application for example, in stretching extruded tubular plastics net structures of the type in which the individual net strands have a helical disposition relative to the tube axis.

According to the present invention there is provided apparatus for transversely stretching a tubular material by continuously driving the material along an internal mandrel structure which increases in cross-section along its length wherein the mandrel structure comprises a hollow mandrel and a flexible endless sleeve toroidally embracing the mandrel and wherein drive means is associated with the mandrel structure downstream of the largest cross-section of the mandrel (or the point of commencement of the largest cross-section of the mandrel) for frictionally driving the sleeve and tubular material to be stretched which has been fed over the sleeve, along the outer surface of the mandrel.

The drive means conveniently takes the form of a series of driven friction rollers or endless belts circumferentially spaced around the mandrel structure and engaging the outer surface of the sleeve so that in use, the tubular material to be stretched is fed between the nip of the drive means and the mandrel structure. Further, as indicated, the drive means is located to operate on a portion of the mandrel structure beyond its point of maximum expansion, which portion of the mandrel may be of constant cross-section equal to the maximum mandrel cross-section or may be of reducing cross-section. The effect of driving the material over the mandrel along with the moving sleeve, the drive on the material being produced from a position beyond the point of maximum expansion of the mandrel, is substantially to eliminate longitudinal or machine direction stretching forces on the material so that the material is stretched only in the transverse direction by progressive expansion of the mandrel cross-section.

The mandrel may have a divergent-convergent form with the drive means operating of the convergent mandrel portion.

Materials suitable for the mandrel itself include metals or plastics and it is desirable that the mandrel surfaces be formed from an antifriction material such as Polytetrafluorooethylene (PTFE). Antifriction rings may also be provided at the inlet and discharge rims of the mandrel to facilitate movement around these rims and circulation around the mandrel of the toroidally shaped endless sleeve.

The endless sleeve should snugly embrace the mandrel whilst still being free to slide on the mandrel surface. Suitable materials for the sleeve include tubular knitted fabrics with elastomeric threads running transversely of the tube to retain the sleeve fitting snugly on the mandrel, tubular woven fabrics with elastomeric weft threads, or tubular extruded plastics net products of the Netlon (RTM) type in which the strands extend helically of the tube. A preferred sleeve material is a tubular knitted net having diamond or hexagonal shaped mesh openings which allows the geometry of the net to change to accommodate changes in diameter as the net travels along the mandrel. The sleeve can for example be knitted from a multifilament Nylon yarn of 2,800 decitex. The diameter of the sleeve in relation to the cross-section of the mandrel should be such that at the smallest cross-section of the mandrel the sleeve is substantially unstretched transversely with no overlapping of its net strands.

When using apparatus according to the invention for the transverse stretching of tubular plastics nets having the strands running helically the tubular nets may be heated to temperatures up to about 120° C. whilst progressing along the mandrel structure by means of hot air jets or water sprays. Also, when using the apparatus for this particular application it has been found that the tubular net can be "overfed" onto the mandrel structure i.e. it can be continuously and positively fed onto the mandrel (by brushes or like means associated with the mandrel) at a higher speed than the speed of operation of the drive means so that the net progresses down the mandrel structure in a bunched or gathered state. This is with a view further to ensuring that the net is stretched purely transversely.

Whilst the apparatus has been described as being particularly useful for transversely stretching tubular plastics net products having the strands running helically it will be understood that it can also be used for stretching other tubular products such as films or nets in which the strands run respectively longitudinally and transversely of the tube.

Figure 3:
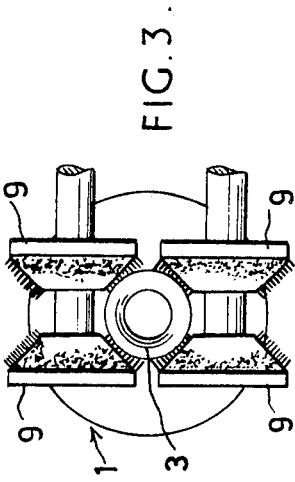
Figure 2:
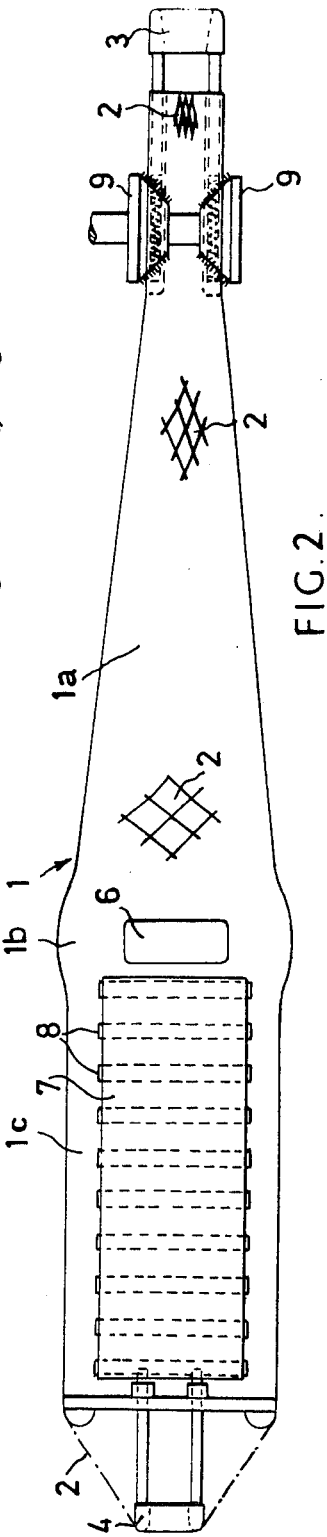

The invention is illustrated by way of an example in the accompanying drawings in which:

FIG. 1 is a sectional side view of transverse stretching apparatus for tubular material, FIG. 2 is a plan view of the apparatus with the drive belts removed and FIG. 3 is an end view of the apparatus.

The apparatus illustrated takes the form of a hollow metallic mandrel 1 having a divergent substantially conical upstream section 1a, a convergent section 1b and a flattened downstream section 1c having a substantially constant cross-section smaller than the maximum mandrel cross-section. A sleeve 2 of knitted Nylon net with diamond shaped mesh openings toroidally embraces the mandrel, the sleeve being formed from a tube of knitted net of the type described above which is fed through the mandrel interior, has its ends opened out and brought back along the outer mandrel surface, the ends being joined together to form the toroidal sleeve. A spring-loaded sleeve tensioning ring 3 of PTFE is provided at the infeed end of the mandrel and a fixed PTFE return ring 4 is provided at the downstream end of the mandrel, rings 3 and 4 facilitating movement of the sleeve around the turning points.

To drive the sleeve 2 (and tubular material to be stretched) along the mandrel, endless caterpillar-type drive belts 5 operate on the flattened section 1c of the mandrel, the drive means also serving to support the entire mandrel structure.

It will be seen that as the net sleeve 2 progresses along the divergent section 1a of the mandrel its geometry changes so that each diamond-shaped mesh opening becomes progressively flattened longitudinally.

Anti-friction means is included within the hollow interior of the mandrel for reducing friction between the endless sleeve and the outer surface of the mandrel.

The anti-friction means takes the form in one instance of free running rollers 6 the peripheries of which operate in slots in the surface of the mandrel at a position immediately downstream of the section of maximum divergence of the mandrel. In another instance the anti-friction means takes the form of endless belts 7 on support rollers 8, the belts again operating in slots in the flattened section of the mandrel surface so as to co-operate with the drive means for the endless sleeve. The aforementioned free-running rollers or "hold back rollers" 6 are also so positioned as to co-operate with the sleeve drive means as shown.

At the upstream end of the mandrel structure driven overfeed brushes 9 are provided adapted if required to drive tubular material to be stretched onto the mandrel structure at a speed at least double that of the speed of the drive means so as to obtain an "overfeed" effect as described above.

In operation, the sleeve 2 is continuously driven over the mandrel by the drive means. Tubular material to be stretched is fed onto the mandrel at the infeed end over the sleeve 2 and moves along the mandrel whilst being stretched transversely. If an overfeed of the material is required the brushes 9 are operated at a higher linear speed than the drive belts. If no overfeed is required the brushes can be removed or operated at the same linear speed as the drive belts. When stretching extruded plastics nets hot water, steam or hot air may be played onto the net during the stretching operation.

As an example, the ratio of diameters of the mandrel as between its inlet end and its point of maximum divergence may be of the order of about 3:10.

I claim:

1. Apparatus for transversely stretching a tubular material by continuously driving the material along an internal mandrel structure which increases in cross-section along its length comprising a mandrel structure including a hollow mandrel and a flexible endless sleeve toroidally embracing the mandrel, drive means associated with said mandrel structure downstream of the largest cross-section of the mandrel for frictionally driving the sleeve and tubular material which has been fed over the sleeve, along the outer surface of said mandrel.

2. Apparatus as claimed in claim 1 wherein said mandrel has a diverging substantially conical infeed section followed by a converging section and then a flattened section of substantially constant cross-section.

3. Apparatus as claimed in claim 2 wherein said drive means comprises endless belts operating on said flattened section of said mandrel.

4. Apparatus as claimed in claim 1 wherein said sleeve comprises a tubular knitted net fabric having diamond or hexagonal shaped mesh openings.

5. Apparatus as claimed in claim 1 which includes overfeed means associated with an infeed end of said mandrel for feeding material to be stretched onto said mandrel at a higher speed than the speed of travel imposed by said drive means.

* * * * *